June 11, 1963 W. HAEUSSERMANN ETAL 3,092,918
SATELLITE MOTION SIMULATOR
Filed April 29, 1960 7 Sheets-Sheet 1

Walter Haeussermann
Adolf L. Herrmann,
INVENTORS.

BY S. J. Rotondi,
A. T. Dupont,
and
Alvin E. Moore
ATTORNEYS.

Walter Haeussermann
Adolf L. Herrmann,
INVENTORS.

June 11, 1963 W. HAEUSSERMANN ETAL 3,092,918
SATELLITE MOTION SIMULATOR
Filed April 29, 1960 7 Sheets-Sheet 7

Walter Haeussermann
Adolf L. Herrmann,
INVENTORS.

BY S. J. Rotondi,
A. T. Dupont,
and
Alvin E. Moore
ATTORNEYS.

United States Patent Office 3,092,918
Patented June 11, 1963

3,092,918
SATELLITE MOTION SIMULATOR
Walter Haeussermann and Adolf L. Herrmann, Huntsville, Ala., assignors to the United States of America as represented by the Secretary of the Army
Filed Apr. 29, 1960, Ser. No. 25,800
14 Claims. (Cl. 35—43)
(Granted under Title 35, U.S. Code (1952), sec. 266)

The invention described herein may be manufactured and used by or for the Government for governmental purposes without the payment of any royalty thereon.

This invention relates to a satellite motion simulator. Although it is especially intended for use in simulating the motions of an attitude-controlled satellite, it also may be utilized to simulate the motions of other attitude-controlled space vehicles.

After being stabilized in space, a satellite in orbit or a space vehicle traveling to the moon or another planet maintains its attitude relative to its roll, pitch and yaw axes unless moved out of it by some space-traversing external force, for example, by a stray current, a variation of the gravitational density, rotational acceleration of internal parts, or contact with meteoric dust. To maintain the vehicle in a desired attitude, such force should be counteracted by the reactive expulsion of gaseous or solid matter from the craft or by rotating flywheel masses.

In simulating such a space vehicle for the testing of attitude-controlling devices in a laboratory the principal problems are: (1) to substantially equalize the effects of gravity on the various parts of a universally mounted instrument support in all of its possible attitudes; (2) largely to nullify the effect of friction on movements of the support, so that its pivotal motion, due to actuation of a given set of missile-steering or attitude-controlling instruments and the resulting reaction on the support, may be determined without appreciable braking of the motion by accuracy-disturbing friction.

In view of the above facts, it is an object of this invention to provide an instrument-carrying, universally-mounted support that holds various adjusted stationary positions relative to its roll, pitch and yaw axes, without any attitude-disturbing effect of gravity.

Another object of the invention is to provide a missile-simulating support that is substantially free to continue in an attitude-disturbing motion until it is stopped and reversed by attitude-controlling mechanism that is being tested on said support.

A further object of the invention is to provide a missile-motion simulator that comprises a nearly frictionless, self-aligning bearing, with the center of gravity of the movable part of the simulator being located substantially at the center of the self-aligning bearing.

Another object is to provide such a simulator that has temperature-compensating mechanism whereby changes in temperature do not shift the center of gravity of the support away from the center of its universal pivoting.

The foregoing and other objects will become more fully apparent from the following detailed description of exemplary structure embodying the invention and from the accompanying drawings, in which.

Figures 1, 2A:
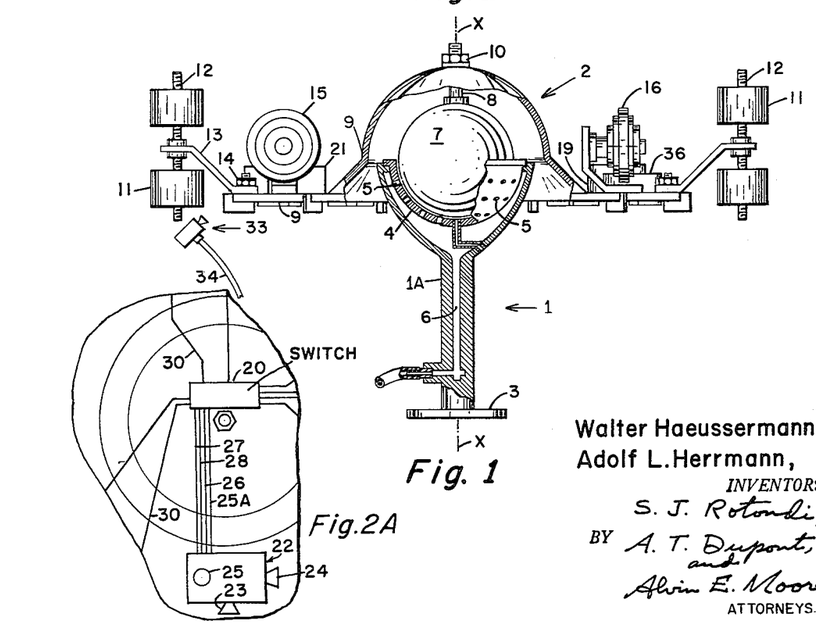
FIGURE 1 is a semi-schematic, elevational view, partly in section, of one form of the invention.
FIGURE 2A is a fragmentary view showing a photoelectric device which can be used to replace the stabilized platform, in FIGURES 1 and 2.
Figure 2:
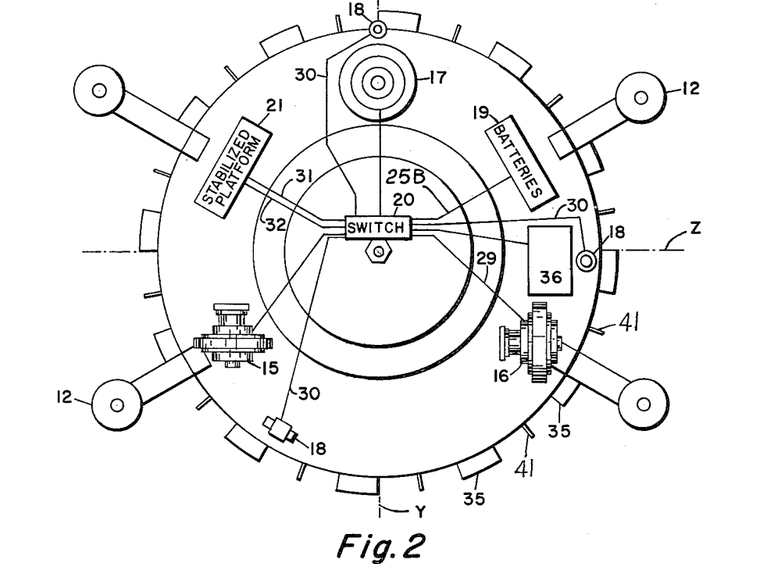
FIGURE 2 is a plan view of the device shown in FIGURE 1.

In FIGURES 1 and 2 the simulator of this invention is shown as comprising an air-transmitting, support element 1, and an attitude-controlled platform 2 that is floatingly supported by an air film between it and support 1.

Element or sub-combination 1 comprises: a pedestal 1A, which may be fixed by means of disk 3 to a floor or table in a laboratory; a semi-spherical bearing cup or plate 4 having apertures 5; and conduit 6 for supplying air to the concave surface of the cup via apertures 5.

Instrument-supporting platform 2 comprises: a ball-like element 7 that rests on a film of air emitted from apertures 5; a rod 8 fixed at its lower end to the ball; an instrument-carrying table 9, fixed to the upper end of rod 8, by means of nut 10; adjustable, internally screwthreaded weights 11; screwthreaded rods 12 on which the weights may be screwed up or down; and means 13—14 for fastening the weights to element 9. Weights 11 and their attachment means serve two purposes: to change the space-vehicle moment of inertia that is simulated; and to balance the air-supported load about the pitch, roll and yaw axes. To change the simulated moment of inertia, the weights may be screwed up or down, thus varying their distance from the center of pivoting within ball 7; or these weights may be unscrewed from rods 12 and replaced by masses of a different size. Alternatively, nuts 14 may be loosened and the outer ends of the bars 13 pivoted toward the ball, before re-tightening the nuts. After a desired moment of inertia thus is simulated, platform 2 and its load may be balanced in various positions by selectively and slightly varying the moment arms of certain of the masses, either by screwing the weights up or down on rods 12 or by loosening nuts 14 and moving one or more of the pairs of weights toward or away from ball 7.

Element 9 supports the attitude-controlling instruments whose functioning is to be tested. Two types of such attitude-control mechanisms that may be tested, either singly or in combination, are shown in FIGURES 1 and 2. These devices are: rotary flywheel-like devices 15, 16 and 17; gun-like, material expelling elements 18. Although such instruments and the other guidance and control elements indicated in FIGURE 2 are not shown in the other views, the universally-mounted table shown in each of the figures is adapted for the support of such devices.

Elements 15, 16 and 17 comprise flywheel masses and light-weight electric or other controllable-speed motors of the type described in copending application Serial No. 792,930, filed on February 12, 1959, now Patent No. 2,973,162, by Walter Haeussermann. Change in the speed of the motors and rotary masses provides for a reaction on the vehicle, for its control to maintain a continuous attitude or, in steering, to obtain a changing attitude in orbit, or outer space, or the atmosphere.

This steering or stabilizing effect is due to the mutual reactions of the space vehicle and a rotary mass, as one turns relative to another, within their overall gyroscopic assembly. In outer space there is no air and little or no gravity to stop any attitude-changing angular momentum acquired by the craft. Similarly, attitude-changing motion of the balanced, air-supported table of this invention is substantially free, and may be countered by rotation of one or more of the flywheels. Since their momentum is equal to ½IW² (where I is the rotary moment of inertia and W the angular velocity), the flywheels may be small in mass and operated at high speeds.

If properly designed from an engineering point of view, these rotary masses absorb undesired tilting motion which a space vehicle of a given moment of inertia (or in the present case the instrument-carrying table 9) tends to acquire due to some undesired torque on the vehicle ( or its simulator). When the vehicle or simulator receives such a torque and begins to tilt into an undesired attitude, a resulting signal sets one or more of the electric motors that rotate the attitude-controlling masses into operation. The change in speed and resulting change in angular momentum of the rotary mass or masses absorbs the torque or torques imparted to the vehicle. Undesired angular impulse about the roll axis, Y, is absorbed by change in the angular momentum of the rotary mass of device 15; such unwanted angular impulse about the pitch axis, Z, is absorbed by device 16; and device 17 similarly corrects the attitude about the yaw axis, X.

Alternatively, or in addition to rotary devices 15, 16 and 17, controls 18 may be utilized. These controls, of the general type of the expulsion devices shown in said co-pending application, eject materials (such as bullet-like solids, a gas or liquid), thus controlling the attitude of the vehicle (or simulator) about its pitch, roll and yaw axes. Each of the expulsion devices 18, shown in FIGURE 2, is adapted to fire small, bullet-like masses or jets in either direction along its longitudinal axis.

If devices 18 expel air instead of solids a compressed-air bottle would be placed on table 9, or, in lieu thereof, pressurized air would be stored in hollow bearing member 7.

Alternative ways of remotely controlling the speeds of the flywheel devices or the firing of expulsion devices 18 are indicated in FIGURES 2 and 2A, and also may be utilized with the air-supported platform of FIGURES 3 to 7. Current is supplied from batteries 19 to automatic switch 20, and this conventionally-designed switch is controlled by a solenoid actuated in response to an electrical signal either from gyroscopically stabilized platform 21 (of the general type of co-pending application Serial No. 794,212, filed on February 18, 1959, now Patent No. 2,963,242, by F. K. Mueller) or from photoelectric device 22, of a known type, comprising photoelectric cells 23, 24 and 25.

In actuating switch 20 by the photoelectric device for control of platform 2 about its pitch axis, for example, a steady light beam is thrown on cell 23, and the platform and its load are tilted, for example by twenty degrees, about the pitch axis, Z. When cell 23 moves away from the beam a signal current which comes from the batteries to device 22 via conductors 25B and 25A is transmitted by device 22 to switch 20 via that one of the conductors 26, 27 and 28 which is connected to cell 23. Switch 20 then routes the current via conductor 29 to flywheel device 16, thus actuating the motor and its associated mass in the proper direction to restore table 9 to the horizontal plane. In this restoring movement device 16 will "hunt" to a certain extent, oscillating the table from its level position until the oscillation is damped. The efficiencies of various types and engineering designs of damping elements in the control circuit then may be studied, as well as the effects of the tested control system as a whole.

In lieu of or in addition to actuation of device 16, the signal from one of conductors 26, 27 and 28 may be transmitted thru line 30, to fire the pitch-controlling one of expulsion devices 18.

In a similar way, the roll-controlling devices (15 and the expulsion device 18 shown on the left in FIGURE 2) and the yaw-controlling devices may be controlled by means of light beams on cells 24 and 25.

Instead of controlling the table's attitude by a current from device 22, the stabilizing gyroscopes, accelerometers and computer of guidance device 21 may be energized by current thru conductor 31, so that a current is sent to switch 20 from device 21, thru one or more of the wires in bundle 32, depending on the quadrant in which tilting occurs; and one or more of the control devices is correspondingly actuated. Conductor 32 comprises three sets of wires, one set for each attitude-controlling device or pair of devices, that functions relative to one of the axes.

Another, optional way of remotely controlling the attitude-varying means is by the use of a very fine electrical conductor, leading from outside the device to the instrument-supporting table. Thru this conductor current may be supplied to the control devices by actuation of switches outside the air-supported platform.

For simulating external torques on table 9 about the yaw axis, X, air jet 33 is provided. It receives compressed air or other pressurized gas thru hose 34, which is connected to a reservoir or compressor. When this jet is valve-controlled to supply a stream of air against vanes 41 table 9 is rotated about its yaw axis. Other vanes 35 optionally may be used with jet 33 (or with a second air jet) for tilting the table about one of the axes Y and Z.

Telemetering device 36, of a standard type, optionally may be placed on the platform for sending signals (simulating telemetered signals from a space vehicle) of information concerning the functioning of the control devices.

A second, and preferred, form of the invention is shown in FIGURES 3 to 7. In this form large angles of tilting of the instrument-supporting table in any direction may be obtained with ease, due to air bearing 49.

Figure 3:
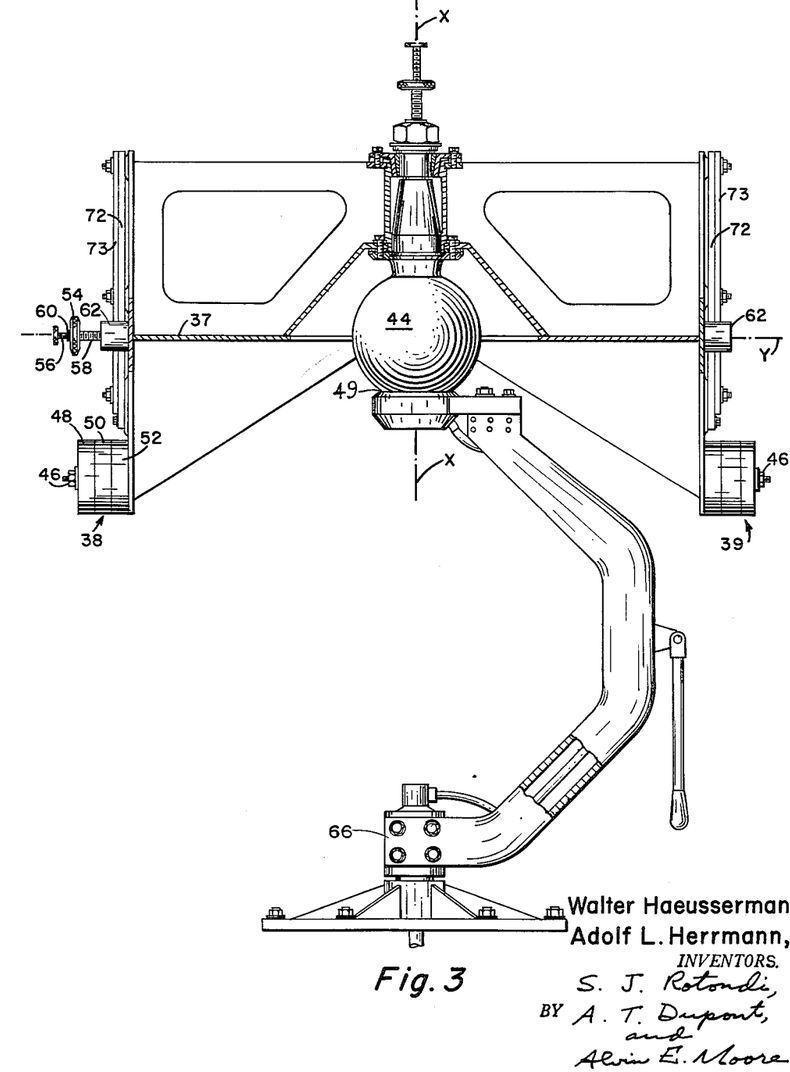
FIGURE 3 is an elevational view, partly in section and partly broken away, of a second form of the invention, shown in an attitude wherein its yaw axis is vertical.
Figure 4:
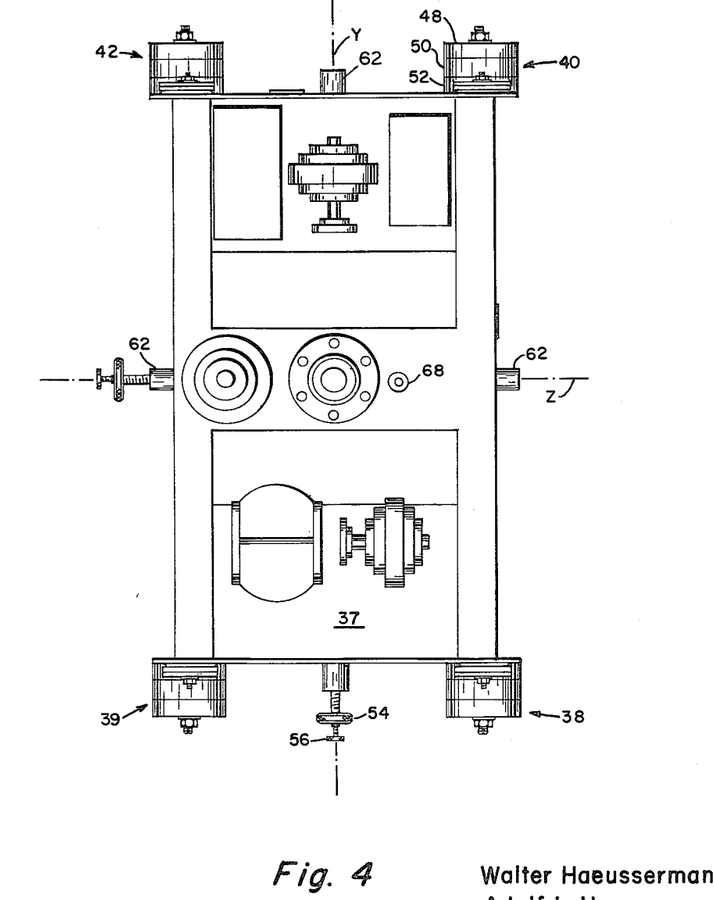
FIGURE 4 is a plan view of the simulator of FIGURE 3.

In FIGURES 3 and 4, instrument table 37 is shown in a level position. This position is obtained, after the instruments to be tested are in place on the table, by changing the masses of weights 38, 39, 40 and 42, relative to each other and to the center of ball 44, until the table is roughly level. This change of mass may be obtained by removing one or more of the nuts 46, and replacing some of the separate disks 48, 50 and 52 with other disks of different masses.

After this rough adjustment, a finer balance in the horizontal plane is obtained by moving vernier elements 54 and 56 toward or away from ball 44 until the exactly level position of FIGURE 3 is obtained.

Nuts 54 are screwthreaded on rods 58; and the finer, vernier screws 56 are screwthreaded in bores within rods 58. These rods have pointed inner ends and squared or hexagonal outer ends 60 by means of which they may be screwed into and locked within bores in bosses 62 that are welded to the frame. As shown in FIGURE 4, enough bosses 62 are provided for the addition of vernier balancing elements if these are needed for quick balancing after a change of the load on the table.

Figure 5:
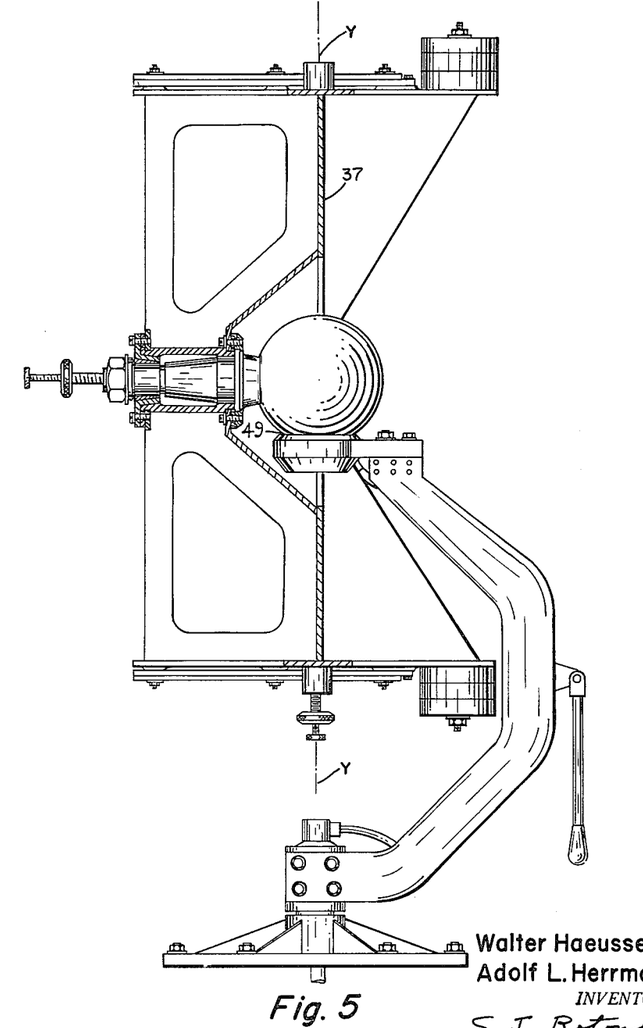
FIGURES 5, 6 and 7 are elevational views, partly in section, of the simulator in three attitudes that are different from that of FIGURE 3.

The next step in the balancing of the air-supported load may be made after manually tilting the table about its pitch axis, Z, ninety degrees from its horizontal position of FIGURES 3 and 4, into the position of FIGURE 5. Here again certain of the moments of the balancing weights are adjusted, until the load remains balanced in the vertical position of this figure.

Figure 6:
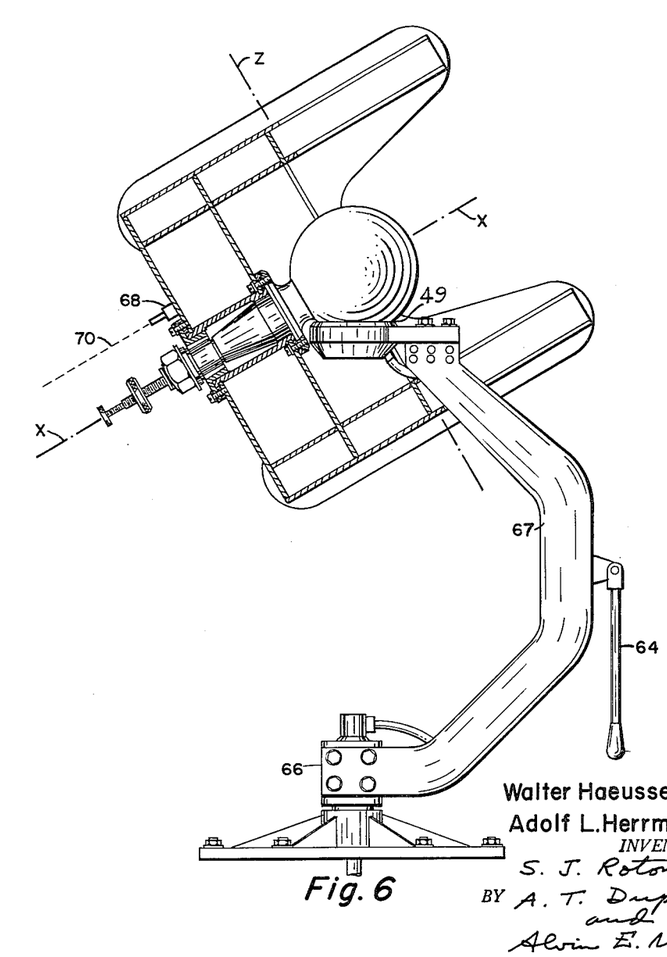

Then the table is moved back into the horizontal plane, and from thence it is tilted about the roll axis, Y, toward its extreme position in this movement, shown in FIGURE 6. In the balancing operation, however, the table is tilted only ninety degrees and stopped there, with its pitch axis, Z, in the vertical plane. In this position, the balancing weights are again adjusted, for balancing the table relative to the roll axis.

Figure 7:
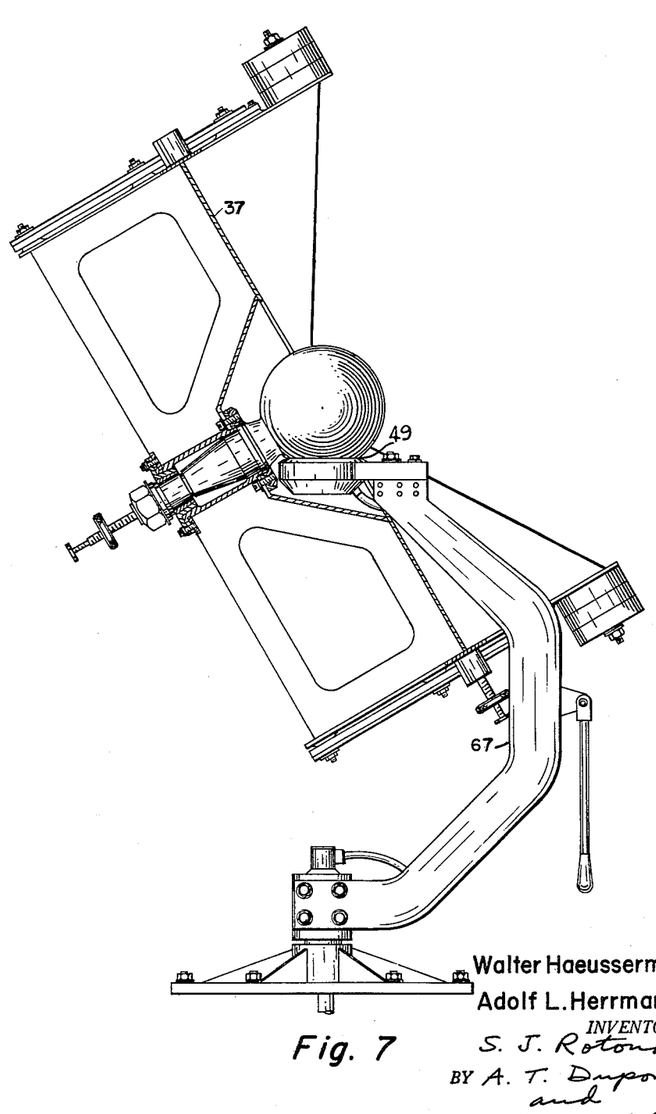

In FIGURE 6 the table is shown as having been tilted its maximum amount in one direction about its roll axis, that is, 120 degrees to the left from its level position shown in FIGURE 4. It may also be tilted about the roll axis 120 degrees to the right from its level position, making a total range of tilting motion about this axis of 240 degrees. This maximum range exists in any vertical plane, thru 360 degrees of rotation of the table. Such rotation preferably is effected by lifting handle 64 and manually rotating it and the table on bearings within bearing support 66; but, alternatively, a servomotor may be utilized. In any plane determined by this rotation, a large range of tilting motion is possible due to the elbow bend, 67. As indicated in FIGURE 7, this bend allows a maximum tilting of the longest extent of the table thru 240 degrees, about the pitch axis, Z.

Any means for indicating the angle of tilting motion may be used. A theodolite may be utilized or, optionally and preferably, a light beam projector 68 (FIGURE 6) may be mounted on the table for casting upward a light ray, 70. By means of calibrated circles and their radii accurately drawn on the laboratory ceiling the degree and direction of the tilt may be ascertained. Extreme tilting is indicated by lines on the walls.

The expansion and contraction of the parts of table 37 and its load due to changes of temperature are a source of possible inaccuracy, in that they usually are not uniform. This lack of uniformity is due to welding, differences in the grain of the metal of the various parts and differences in the materials of certain of the parts from the principal materials of the table. For example, ball 7 and its shaft 8 may be of hardened steel and the main part of table 37 may be of annealed steel; and the instruments may comprise non-ferrous materials. With a change in temperature, warping of the table out of its original shape, with a consequent shift of the center of gravity from the center of the ball, thus usually occurs. In practice it has been observed that this shift of the center of gravity in a simulator of this general configuration of FIGURES 3 to 7 is downward from the center of the ball. The effect of this shift is compensated by a device, subject to the same temperature change, which moves a mass in the opposite direction. A specific example of such a device is shown in FIGURES 3, 8, 9 and 10. Four rigid upright elements 72—73 are utilized, one above each of the sets of balancing weights. Bars 72 (shown in detail in FIGURES 8, 9 and 10) are of a material that has a higher coefficient of thermal expansion than the material of the rest of the air-supported platform, and preferably are of nylon plastic. They are fixed to instrument-supporting table 37 at their lower ends. Each bar is rigidly attached at its upper end to a heavier, steel plate 73. This plate serves as a weight, which is pushed upward by the nylon-plastic bar 72 as it expands with increase of temperature. The masses of the plates and of the plastic bars are engineeringly calculated for a balance in the upward and downward expansions of the material of the air-supported load at each side and end of the table.

Figure 8:
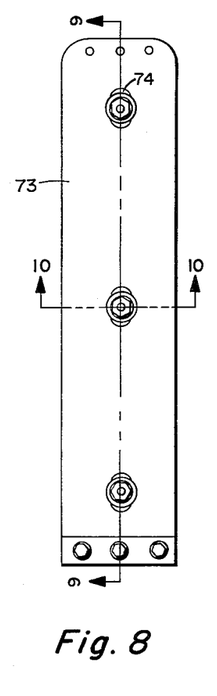
FIGURE 8 is an elevational detail view of a temperature-compensating device that may be used on the universally-mounted platform.
Figure 9:
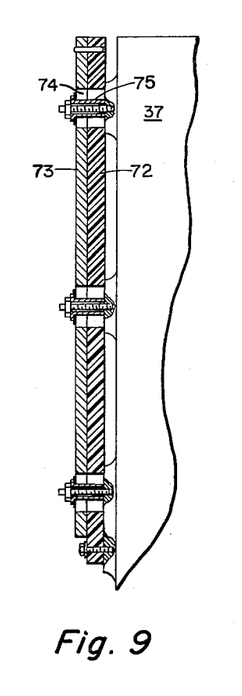
FIGURES 9 and 10 are sectional detail views, respectively, from the planes 9—9 and 10—10 of FIGURE 8.
Figure 10:
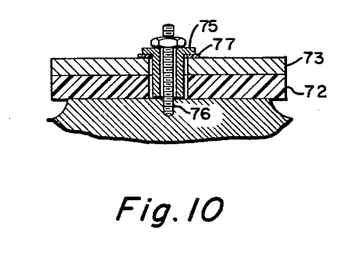

Each bar 72 is maintained in parallel relationship with its side of the table by means of vertically elongated slots 74, which allow the bars to slide over bushings 75. These bushings are fixed to the table by bolts 76. Nylon-plastic washers 77 are located between the bushing and the metal plate 73; these may be of a known, resilient type.

Although these temperature-equalizing bars and weight plates are illustrated only with the table of FIGURE 3, they may be used with the table of any of the other figures.

*Operation*

The device of FIGURES 3 to 7 may be provided with any of the attitude-controlling instruments shown in FIGURES 1 and 2; and it operates in the same general manner as that of FIGURES 1 and 2. However, the preferred form of the simulator, having an elbow bend in the table-supporting arm, allows much greater maximum ranges of tilting motion.

After the table of FIGURES 3 to 7 has been loaded with the particular control instruments to be tested and has been balanced about its axes as above described it is tilted and stabilized at a desired angle from the horizontal. This angle is determined by ascertaining on the calibrated ceiling where the light beam 70 is pointing as the platform is manually tilted. The particular calibrated circle (of a concentric series of circles) that is within or adjacent to the beam indicates the angle of tilting and the calibrated radius of this circle that is nearest to the beam indicates the direction in which the table is tilted. Any known way of measuring the inclination of the table may be utilized in lieu of the above-described measuring means.

After this determination of the angle and direction of the tilting the flywheel devices and/or expulsion devices are energized until the table is restored to and again stabilized in the horizontal plane. From the data thus obtained the effectiveness of the attitude-controlling devices—their speed of correction, cross-coupling effects, hunting and damping characteristics, the precession of the flywheel devices, and other engineering factors, may be studied. The resulting conclusions are of use not only in calculating the steering effects of such control devices as elements 15, 16, 17 and 18, but also in determining the attitude-stabilizing effects of these devices on a space vehicle that maintains a given attitude in space.

The invention comprehends various changes in structure from that herein illustrated, within the scope of the subjoined claims.

The following invention is claimed:

1. A space vehicle motion simulator comprising: a pedestal having a parti-spherical, concave, upper surface; means, extending thru said pedestal, for supplying pressurized gas to said surface; a missile-simulating device having a range of movement, which is substantially free, for allowing the device to respond to simulated attitude disturbing motions, said device comprising an element, disposed for movement relative to its pitch, yaw and roll axes, for the support of missile-controlling instruments, to be tested, and a ball-like bearing member fixed to a central portion of said element and having a lower, parti-spherical, convex surface that fits within said concave upper surface and floats on a bearing film of said pressurized gas; means carried by said element for imparting said attitude disturbing motions to said element; actuating means carried by said element for actuating said missile controlling instruments for response thereof to said attitude disturbing motions; masses supported by said element for balancing said element about the pitch, yaw and roll axes and for simulating a predetermined space vehicle moment of inertia; means for detachably and adjustably fastening each of said masses to said element, whereby said masses may be detached and replaced by other masses for variation of the simulated vehicle moment of inertia, and whereby said masses individually may be altered in position relative to the center of gravity of said missile simulating device, for balancing said missile simulating device on said gaseous film; the outer portions of said element and pedestal having sufficient clearance between them to allow a substantial amount of tilting motion of the element relative to the pedestal, said motion simulating changes of missile attitude when missile-controlling instruments are being tested on said element.

2. A simulator as set forth in claim 1, in which said means for detachably and adjustably fastening said masses comprises bars, means for detachably and adjustably connecting the outer end of each of said bars to one of said masses, means for detachably connecting the inner end of each of said bars to said element, the connection of said bars to said element being spaced apart a predetermined distance, whereby the position of said masses relative to said element individually may be adjusted for positioning said element in different positions relative to the pitch, yaw and roll axes.

3. A simulator as set forth in claim 2, in which said means for detachably and adjustably connecting each of said bars to one of said masses comprises a rod fixed to each of said bars and coacting screwthreads between said rod and one of said masses.

4. A simulator as set forth in claim 3, in which each of said rods is vertical and is screwthreadedly connected to and supports two of said masses, one being above and the other below the outer end of their supporting bar.

5. A simulator as set forth in claim 4, in which said means for detachably connecting the inner end of each of said bars to said element comprises a bolt and nut, said bar, bolt and nut being constructed and arranged to permit pivotal adjustment of said bar and its associated masses toward or away from said element.

6. A space vehicle motion simulator comprising: a pedestal having a parti-spherical, concave, upper surface; means, extending thru said pedestal, for supplying pressurized gas to said surface; a missile simulating device having a range for movement, which is substantially free, for allowing the device to respond to simulated attitude disturbing motions, said device comprising an element disposed for movement relative to its pitch, yaw and roll axes for the support of missile controlling instruments to be tested; and a ball-like bearing member fixed to a central portion of said element and having a lower, parti-spherical convex surface that fits within said concave upper surface, and floats on a bearing film of said pressurized gas; a base adapted to be attached to a rigid support, and an upstanding arm connected at its lower end to said base and having at its upper end said concave, upper surface, said arm having a bend in its middle portion to provide sufficient clearance for the lower part of said element to move unrestrictedly through a predetermined arc in said tilting motion.

7. A simulator as set forth in claim 6, in which said pedestal further comprises bearings rotatably connecting said upstanding arm to said base.

8. A simulator as set forth in claim 7, in which said pedestal further comprises means connected to said arm for rotating it on said bearings.

9. A simulator as set forth in claim 8, in which said means connected to the arm is a manually actuatable handle.

10. A simulator as set forth in claim 6, in which said arm further comprises an upper horizontal bar and a cup-like element affixed to said bar and provided with said concave, upper surface.

11. A simulator as set forth in claim 6 which said missile-simulating device further comprises a plurality of elongated bars fixed at their lower ends to said instrument-supporting element and free at their upper ends for expansion or contraction due to temperature changes, said elongated bars being of a material that has a higher coefficient of thermal expansion than the material of said element.

12. A simulator as set forth in claim 11, in which each of said bars is of plastic material, said simulator further comprising a metal weight supported by each of said bars.

13. A simulator as set forth in claim 11, which further comprises headed studs fixed to sides of said instrument-supporting element, said bars having elongated slots slidably encompassing the stems of said studs.

14. A simulator as set forth in claim 13 which further comprises a weight attached to the upper end of each of said bars.

References Cited in the file of this patent

UNITED STATES PATENTS

| 1,873,416 | Johnson | Aug. 23, 1932 |
| 2,110,343 | Taylor | Mar. 8, 1938 |
| 2,710,234 | Hansen | June 7, 1955 |

FOREIGN PATENTS

| 453,134 | Canada | Dec. 7, 1948 |

OTHER REFERENCES

The Product Engineering Magazine, Jan. 4, 1960; page 47.